G. SHIELDS.
RECEPTACLE.
APPLICATION FILED NOV. 28, 1906. RENEWED OCT. 29, 1907.

899,338.

Patented Sept. 22, 1908.

Witnesses:
H. D. Penney
Robert Adt.

Inventor:
George Shields.
By his Attorney, F. H. Richards.

UNITED STATES PATENT OFFICE.

GEORGE SHIELDS, OF BROOKLYN, NEW YORK, ASSIGNOR TO EMPIRE WOLVERINE MANUFACTURING COMPANY, OF NEW YORK, N. Y., A CORPORATION OF NEW YORK.

RECEPTACLE.

No. 899,338.

Specification of Letters Patent.

Patented Sept. 22, 1908.

Application filed November 28, 1906, Serial No. 345,481. Renewed October 29, 1907. Serial No. 399,623.

*To all whom it may concern:*

Be it known that I, GEORGE SHIELDS, a citizen of the United States, residing in borough of Brooklyn, in the county of Kings and State of New York, have invented certain new and useful Improvements in Receptacles, of which the following is a specification.

This invention relates to receptacles of the type that are composed of a casing of wood or other material that is lined with metal such as sheet metal, and which lining is further provided with an inner coating of a vitreous nature, such as glass that will produce no chemical action on the contents of the vessel.

One of the objects of the invention is to provide such a vessel with a lining of glass or equivalent vitreous material, and to provide a special form of vessel whereby the glass can be formed on two complemental portions thereof before assembling, which can be afterward secured together by soldering, without danger of fracture of the glass; yet form a hermetically sealed joint.

Another object of the invention is to provide a specific means of forming such a joint.

Figure 1:
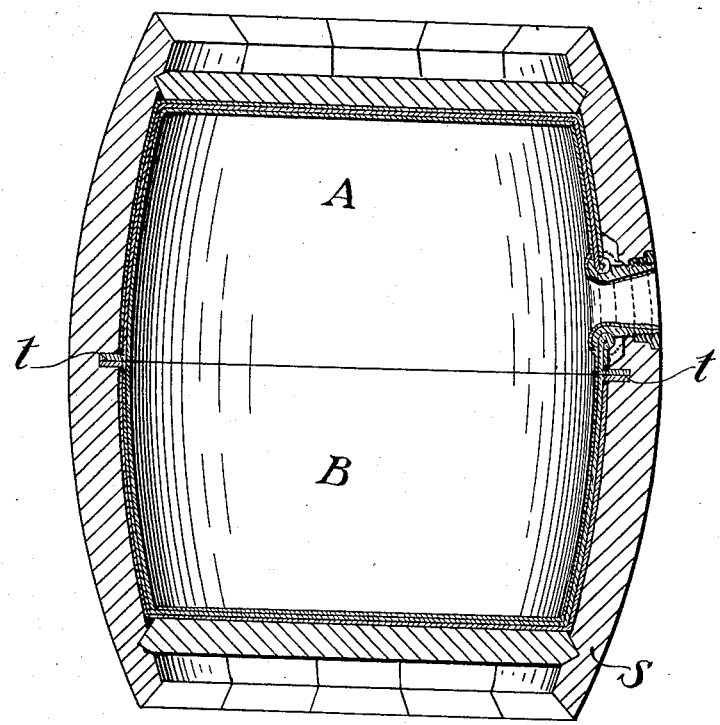
Figure 2:
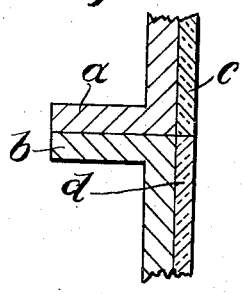
Figure 3:
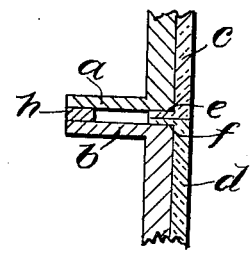

In the accompanying drawings representing embodiments of my invention, Figure 1 is a vertical axial section through the receptacle. Fig. 2 shows one means of securing the complemental portions together by soldering. Fig. 3 shows a modification of the parts shown in Fig. 2.

The lining is shown as composed of two complemental cup-shaped portions A and B, each comprising bottom and side members, which are shaped when placed together to outline a barrel or other receptacle. Each of the cup shaped portions is provided with a flange extending outward, as $a$ and $b$. These two portions are provided each with a glass lining, $c$ and $d$ respectively, before they are fastened together. In the form shown in Fig. 2, the glass lining $c$, and $d$, have their edges just meeting when the flanges $a$ and $b$ are brought together whereupon the outer part of the meeting flanges is united by soldering; preferably by electric soldering or welding, by means of which the flanges can be quickly united at their outer portions before the heat has time to be conveyed or conducted to the other parts of the lining and reach the glass, tending to crack it. The vessel is then preferably inclosed in a suitable casing S, that is shown in the form of a wooden barrel formed of staves in the usual manner. The staves will be provided with a suitable circular slot $t$ to receive the flanges $a$ and $b$ of the lining.

Another means of uniting the flanges by soldering, is shown in Fig. 3 in which the glass lining $c$ and $d$ is provided with flanges $e$ and $f$ extending a short distance between the flanges $a$ and $b$, that in this case are not brought together but separated by a flat ring $h$. The ring $h$ is secured to the flanges $a$ and $b$, preferably by electric welding, and the space between the ring $h$ and the flanges $e$ and $f$ will tend to prevent the heat being communicated to the glass lining.

If desired tar paper or asbestos or other suitable insulating or shock resisting material may be inserted between the metal lining and casing of wood or other material as shown at $k$ in Fig. 1.

Where the term soldering is used in the claims, it is to be understood as including any connection between the two complemental lining members whereby the same are united by solder, but the term means does not here refer to a soldering apparatus but as a structural formation of the barrel or receptacle. It is used to include a structure resulting from the soldering operation, either by the employment of a comparatively fusible material to unite the engaging surfaces, or the form of soldering or welding accomplished by the employment of an intense heat such as that produced by an electric current which is termed autogenous soldering or welding. The latter is preferable as the operation is effected so quickly that the heat has not time to pass by conduction to adjacent portions of the vessel, tending to fracture vitreous lining.

Having thus described my invention, I claim:

1. A receptacle comprising two complemental cup-like portions provided with flanges, each portion being provided with a vitreous lining having short flange portions engaging a part only of the said flange portions, and a ring interposed between a part only of the flanges of the cup portions, the ring and said portions being secured together by soldering at the engaging portions.

2. A receptacle comprising two complemental cup-like portions provided with outwardly extending flanges, each portion being provided with a vitreous lining having flange portions engaging the inner portion only of the said flange portions, a ring interposed between the flanges of the cup portions at their outer ends, the ring and said portions being secured together by soldering at the outer engaging portions of the flanges, a wooden casing surrounding the cup portions and having the flange portions embedded therein, and a lining of an insulating material inserted between the cup portions and the casing.

3. A receptacle comprising two complemental cup-like portions provided with outwardly projecting elongated flanges, each cup portion being provided with a vitreous lining, and soldering means whereby the flanges are connected adjacent their outer portions only.

4. A receptacle comprising two complemental cup-like portions provided with outwardly projecting elongated flanges, each cup portion being provided with a vitreous lining, soldering means whereby the flanges are connected adjacent their outer portions only, and a casing surrounding the cup members and having the flanges embedded therein.

5. A receptacle comprising two complemental cup-like portions each provided with an outwardly extending flange, each portion being provided with a glass lining having short flange portions engaging part only of the said flange portions, a flat ring interposed between the flanges of the cup portions at their outer ends, the ring and adjacent cup flanges being secured together by soldering at the outer portions of the flanges.

6. A receptacle comprising two complemental cup-like portions each provided with an outwardly extending flange, each cup portion being provided with a glass lining having a short flange portion engaging the inner portion only of the said cup flange portion, a flat ring interposed between the flanges of the cup portions at their outer ends, the ring and said portions being secured together by soldering and a casing surrounding the cup members.

7. A receptacle comprising two complemental cup-like portions each provided with an outwardly extending flange, each cup portion being provided with a glass lining having a short flange portion engaging the inner portion only of the said flange portion, a flat ring interposed between the flanges of the cup portions at their outer ends, the ring and said portions being secured together by soldering at the outer portions of the flanges, and a wooden casing surrounding the cup portions and having the flange portion embedded therein.

8. A receptacle comprising two complemental cup-like portions provided with flanges, each portion being provided with a vitreous lining having short flange portions engaging a part only of the said flange portions, a ring interposed between a part only of the flanges of the cup portions, the ring and said portions being secured together by soldering at the engaging portions of the flanges, and a casing surrounding the cup members.

9. A receptacle comprising two complemental cup-like portions provided with outwardly extending flanges, each portion being provided with a vitreous lining having flange portions engaging the inner portion only of the said flange portions, a ring interposed between the flanges of the cup portions at their outer ends, the ring and said portions being secured together by soldering at the outer engaging portions of the flanges, and a wooden casing surrounding the cup portions and having the flange portions embedded therein.

GEORGE SHIELDS.

Witnesses:
JOHN WM. H. KASPER,
ARTHUR O. TAYLOR.